United States Patent
Yonezawa et al.

(10) Patent No.: US 6,527,266 B1
(45) Date of Patent: Mar. 4, 2003

(54) CLAMPING APPARATUS WITH DATUM FUNCTION

(75) Inventors: Keitaro Yonezawa; Tsutomu Shirakawa, both of Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 41 days.

(21) Appl. No.: 09/631,670

(22) Filed: Aug. 3, 2000

(30) Foreign Application Priority Data

Aug. 3, 1999 (JP) .......................... 11-219504

(51) Int. Cl.⁷ ................................ B23Q 3/00
(52) U.S. Cl. ....................... 269/309; 269/310
(58) Field of Search ................. 269/309–310

(56) References Cited

U.S. PATENT DOCUMENTS

| | | |
|---|---|---|
| 4,512,068 A | 4/1985 | Piotrowski |
| 4,636,135 A | 1/1987 | Bancon |
| 4,833,760 A | 5/1989 | Sundstrom |
| 5,190,272 A | 3/1993 | Zika et al. |
| 5,415,384 A | 5/1995 | Obrist et al. |
| 5,810,344 A | 9/1998 | Nishimoto |
| 5,961,261 A | 10/1999 | Stark |
| 6,024,354 A | 2/2000 | Yonezawa |
| 6,073,325 A | * 6/2000 | Stark .......................... 269/309 |
| 6,101,888 A | 8/2000 | Yonezawa |
| 6,152,436 A | * 11/2000 | Sonderegger et al. ....... 269/310 |
| 6,161,826 A | * 12/2000 | Forrer ......................... 269/309 |

FOREIGN PATENT DOCUMENTS

| | | |
|---|---|---|
| JP | 64-11743 | 11/1988 |
| JP | 64-1011743 | 11/1988 |
| JP | 1-107928 | 4/1989 |
| JP | 7-314270 | 12/1995 |
| JP | 8-155770 | 6/1996 |
| JP | 11-10468 | 11/1999 |

OTHER PUBLICATIONS

Japanese Patent Office Action related to Japanese Patent Application 11–219504 (issued May 21, 2002).

* cited by examiner

*Primary Examiner*—Lee Wilson
(74) *Attorney, Agent, or Firm*—Bacon & Thomas, PLLC (57) ABSTRACT

A clamp pallet (2) is fixed to a table (1) of a machining center. A work pallet (3) has a positioning hole (12) and an engaging hole (13) formed in order from a lower side. A plug portion (21) projects upwards from the clamp pallet (2). A shuttle member (23) is vertically movably fitted onto the plug portion (21). A coned disc spring (24) urges the shuttle member (23) upwards. The shuttle member (23) has a tapered surface (28) with which the positioning hole (12) makes a tapering engagement. A pull rod (31) is inserted into the plug portion (21). The pull rod (31) pushes engaging balls (34) to the engaging hole (13), thereby driving the work pallet (3) downwards.

7 Claims, 5 Drawing Sheets

CLAMPING APPARATUS WITH DATUM FUNCTION

BACKGROUND OF THE INVENTION

1. Technical Field

The present invention relates to a clamping apparatus with datum function and more particularly to an apparatus for precisely aligning a work pallet or the like movable member with a table of a machining center or the like reference member and fixing the former to the latter.

2. Description of the Earlier Technology

There is a conventional technique recited in Japanese Patent Public Disclosure No. 11-10468 as an example of the clamping apparatus of this type. The conventional technique is constructed as follows.

A retracting nipple fixed to a movable member has a flange fitted into a fitting straight hole formed in a support surface of a reference member, thereby making an axis of the straight hole coincident with that of the retracting nipple. Thereafter, the retracting nipple is pulled to fix the movable member to the reference member.

However, the conventional technique has the following problem.

In order to smoothly attach the movable member to the reference member, a diametrical fitting gap is required between the fitting straight hole and the flange. The existence of that fitting gap reduces the preciseness of alignment between the both members.

SUMMARY OF THE INVENTION

The present invention aims at making it possible to smoothly attach the movable member to the reference member and to precisely align the both members with each other.

In order to accomplish the above aim, an invention of claim 1 has constructed a clamping apparatus with datum function in the following manner, for example, as shown in FIGS. 1 to 4 or in FIG. 5.

The clamping apparatus with datum function aligns a movable member (M) with a reference member (R) and fixes a surface (T) to be supported of the movable member (M) to a support surface (S) of the reference member (R). The surface (T) to be supported of the movable member (M) is opened to provide a socket bore 11, in which a positioning hole 12 and an engaging hole 13 are formed in order from an opened end. An annular plug portion 21 to be inserted into the socket bore 11 projects from the reference member (R). Arranged between the plug portion 21 and the positioning hole 12 is a shuttle member 23 which expands and contracts diametrically. The shuttle member 23 is supported by one 21(12) of the plug portion 21 and the positioning hole 12 so as to be axially movable within a predetermined range. It can also make a tapering engagement with the other 12(21). The shuttle member 23 has a tapered surface 28 formed so as to narrow toward the engaging hole 13. A resilient member 24 urges the shuttle member 23 in a direction for tightening the tapering engagement. A pull rod 31 is inserted axially movably into a cylindrical hole 21a of the plug portion 21. The pull rod 31 has an outer peripheral space in which there is arranged an engaging member 34 movable between a radially outward engaging position (X) and a radially inward disengaging position (Y). A driving means (D) provided in the reference member (R) drives the pull rod 31 for clamping in a direction toward a base end (a first end), thereby enabling an output portion 36 of the pull rod 31 to switch over the engaging member 34 to the engaging position (X) for engaging it with the engaging hole 13 to move the movable member (M) toward the reference member (R). The driving means (D) drives the pull rod 31 for unclamping in a direction toward a leading end (a second end), thereby allowing the engaging member 34 to switch over to the disengaging position (Y).

The invention of claim 1 produces the following function and effect.

When clamping a movable member to a reference member, first, the movable member automatically moves while aligning by a guide action of a tapered surface of a shuttle member to make an axis of a positioning hole of the movable member precisely coincident with that of a plug portion of the reference member. Next, the shuttle member compresses a resilient member and axially moves, thereby enabling a support surface of the reference member to receive a surface to be supported of the movable member. Thus the movable member is constrained through the tapered surface of the shuttle member by the plug portion as well as by the support surface. As a result, the movable member can be precisely and strongly positioned and fixed to the reference member.

According to the present invention, the tapered surface of the shuttle member can guide the movable member while it is aligning, which results in the possibility of smoothly attaching the movable member to the reference member. Further, differently from the conventional technique, the present invention can get rid of a diametrical fitting gap between members to be connected to one another and therefore can align the movable member with the reference member with a high accuracy.

In addition, the plug portion is disposed in the reference member provided with a driving means. When compared with a case where the reference member is provided with a socket bore, the present invention can prevent chips or the like foreign matters from invading the driving means. Therefore, it is possible to use the clamping apparatus in a good condition over a long period of time.

The present invention is preferably constructed as indicated by an invention of claim 2.

Figure 2:
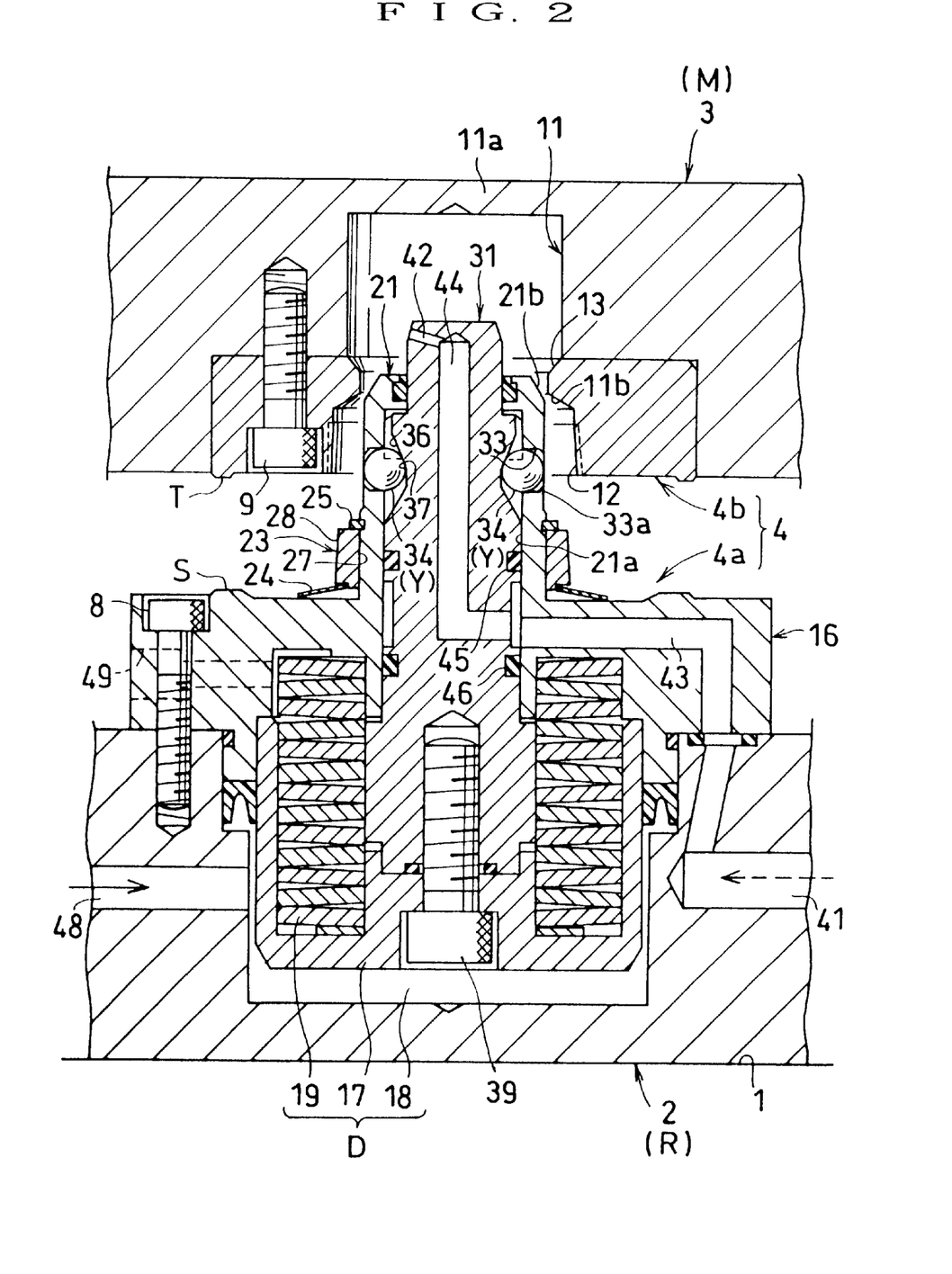
FIG. 2 shows a clamping apparatus provided in the clamping system and is a sectional view in elevation illustrating that a movable member starts being attached to a reference member.
Figure 3:
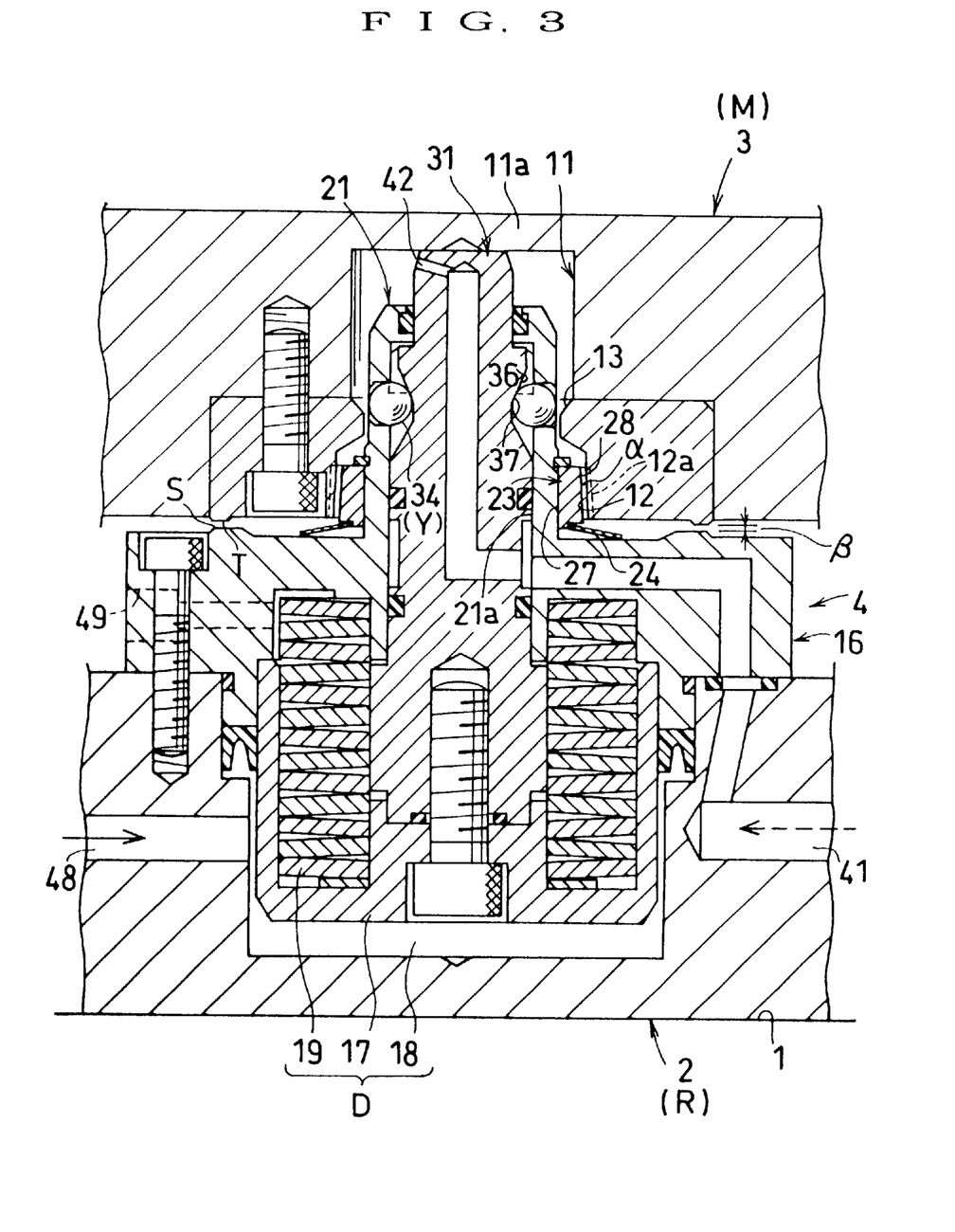
FIG. 3 shows that the movable member has been attached to the reference member and corresponds to FIG. 2;.
Figure 4:
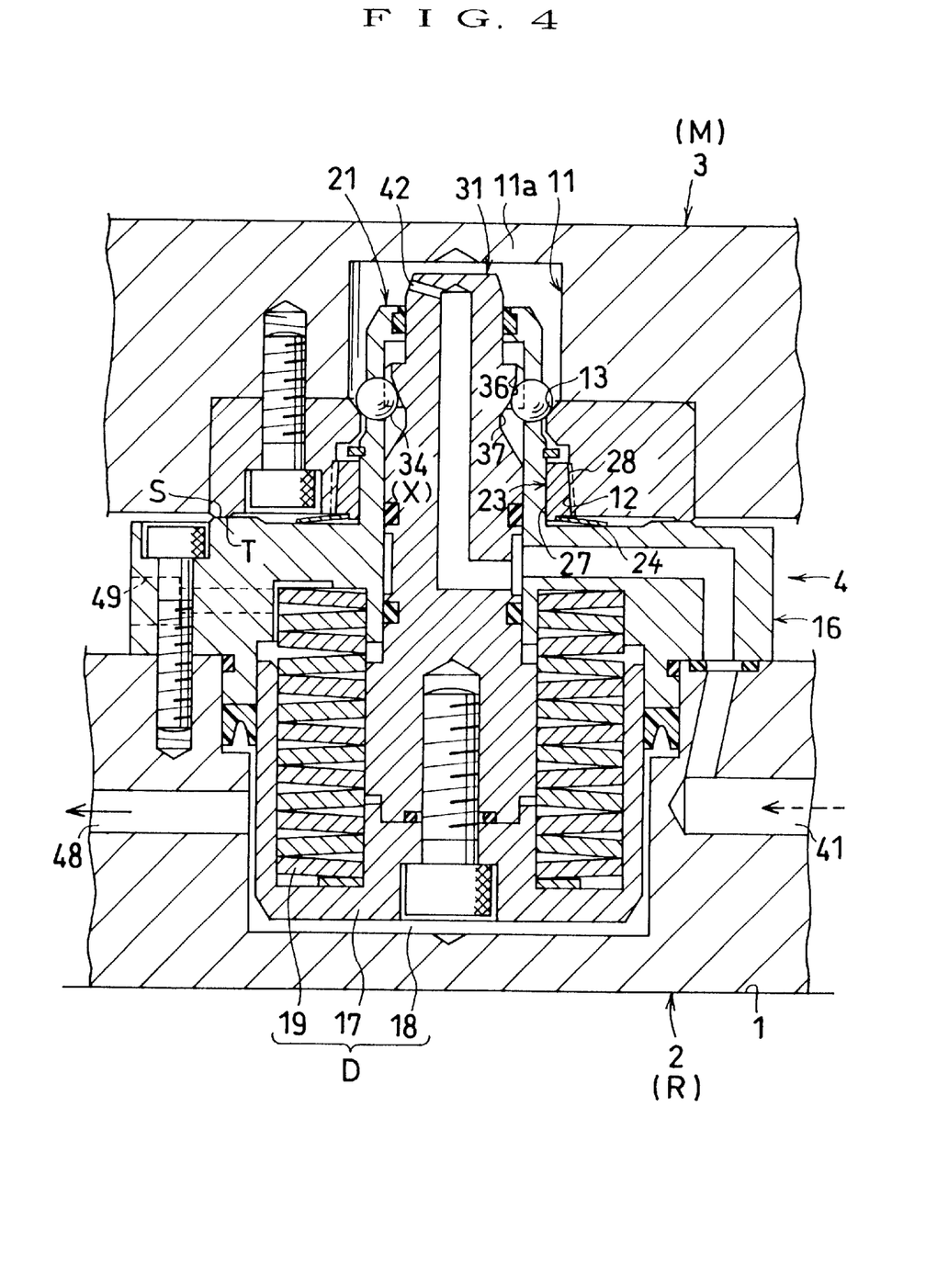
FIG. 4 shows that the movable member has been fixed to the reference member and corresponds to FIG. 2.

For example, as shown in FIGS. 2 to 4, the shuttle member 23 has an inner peripheral surface formed by a straight surface 27 and an outer peripheral surface constructed by a tapered surface 28. The straight surface 27 is supported by the plug portion 21 so as to be axially movable and the tapered surface 28 makes a tapering engagement with the positioning hole 12.

The invention of claim 2 has equipped the shuttle member in the reference member. Accordingly, in the case where a large number of movable members are attached to and detached from one reference member, it is sufficient even if the shuttle member is equipped in a small number. This can construct a clamping system simply.

As indicated by an invention of claim 3, the invention as set forth in claim 1 or 2 is preferably constructed in the following manner.

For example, as shown in FIG. 3, when the pull rod 31 is driven for unclamping, a leading end of the pull rod 31 pushes a top wall 11a of the socket bore 11, thereby forming a fitting gap ($\alpha$) on the tapered surface 28 of the shuttle member 23 and a contact gap ($\beta$) between the support surface (S) and the surface (T) to be supported.

The invention of claim 3 produces an effect of being able to easily remove the movable member from the reference member owing to the existence of the above-mentioned fitting gap and contact gap.

As indicated by an invention of claim 4, the invention as set forth in any one of claims 1 to 3 is preferably constructed in the following manner.

The reference member (R) is provided with a supply port 41 for cleaning fluid and the leading end of the pull rod 31 is provided with a blowout hole 42 for the cleaning fluid. The supply port 41 communicates with the blowout hole 42 through a flow passage 44 within the pull rod 31.

The invention of claim 4 produces an effect of being able to prevent misengagement between the reference member and the movable member because the cleaning fluid discharged through the blowout hole can clean the fitting gap and the contact gap between the both members.

BRIEF DESCRIPTION OF THE DRAWINGS

FIG. 1A to FIG. 1D and FIG. 2 to FIG. 4 show a first embodiment of the present invention;

DESCRIPTION OF THE PREFERRED EMBODIMENTS

A first embodiment of the present invention is explained based on FIG. 1A to FIG. 1D as well as on FIG. 2 to FIG. 4.

First, by relying on FIG. 1A to FIG. 1D and FIG. 2, explanation is given f or a clamping system utilizing a clamping apparatus with datum function according to the present invention.

A clamp pallet 2 of a reference member (R) is fixedly provided on an upper surface of a table I of a machining center. A work pallet 3 of a movable member (M) is fixed to the clamp pallet 2 by a first clamping apparatus 4 and a second clamping apparatus 5 both with datum function and by third clamping apparatuses 6,6 without datum function. Although not shown, a plurality of workpieces can be attached to and detached from an upper surface o f the work pallet 3 by other clamping apparatuses.

The first clamping apparatus 4 is provided with a first datum clamp 4a fixed to the clamp pallet 2 through plurality of bolts 8 and with a first datum ring 4b fixed to the work pallet 3 through a plurality of bolts 9. And mainly shown in FIG. 2, the first datum clamp 4a has a plug portion 21 onto which a shuttle member 23 is fitted. The shuttle member 23 has a tapered surface 28 with which a tapered positioning hole 12 of the first datum ring 4b can make a precise fitting engagement on a reference axis (G) (see FIG. 1B).

Figures 1A, 1B, 1C, 1D:
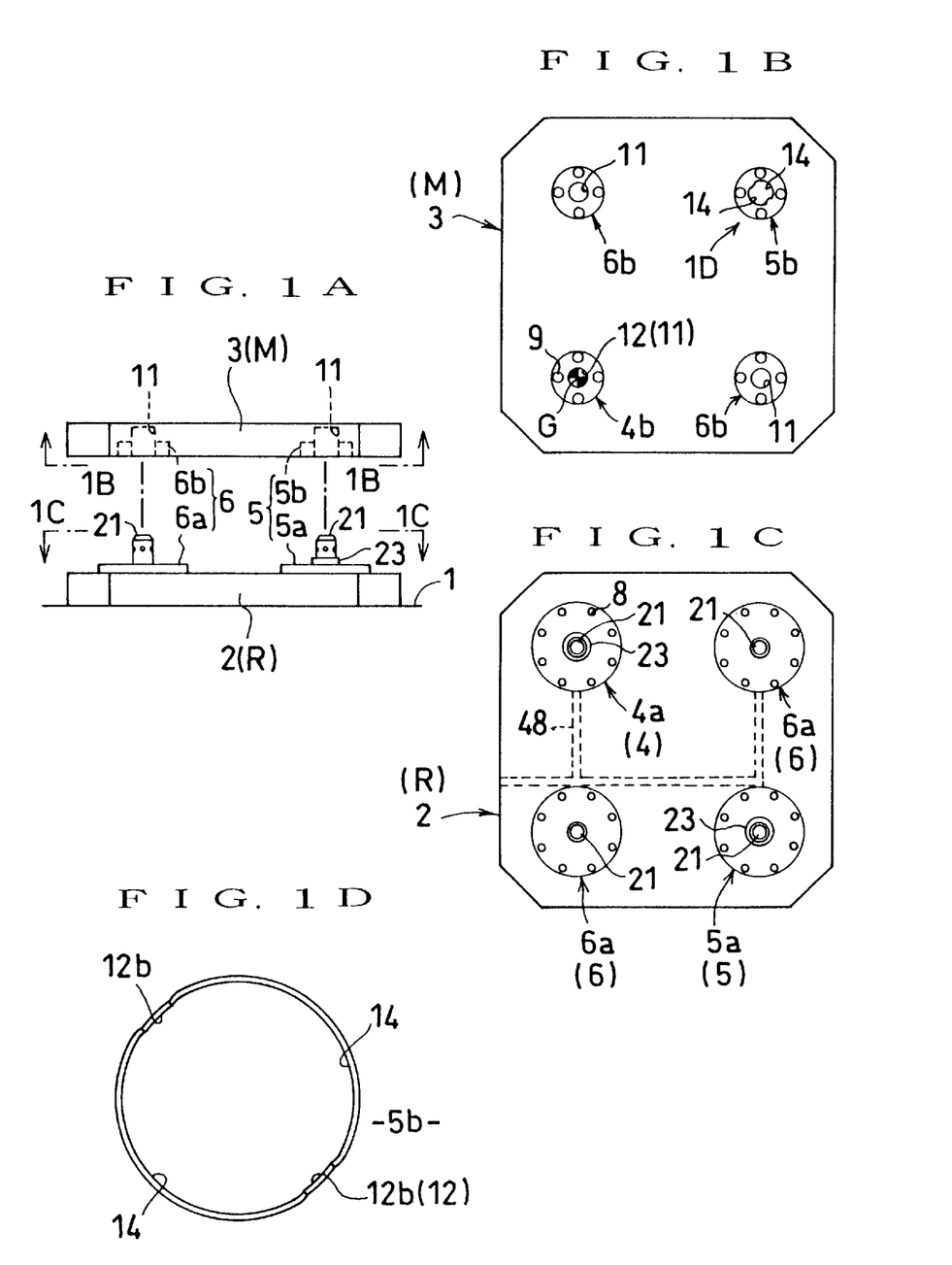
FIG. 1A is a schematic view in elevation of a clamping system utilizing the present invention.
FIG. 1B is a view when seen along a line 1B—1B in FIG. 1A in a direction designated by arrows.
FIG. 1C is a view when seen along a line 1C—1C in FIG. 1A in a direction designated by arrows.
FIG. 1D is an enlarged view of an essential part indicated by an arrow 1D in FIG. 1B.

Besides, the second clamping apparatus 5 is provided with a second datum clamp 5a fixed to the clamp pallet 2 and with a second datum ring 5b fixed to the work pallet 3. The second datum clamp 5a is constructed identical to the first datum clamp 4a. The second datum ring 5b differs from the first datum ring 4b in that it comprises concaving the tapered positioning hole 12 to form a pair of release surfaces 14,14 as shown in FIG. 1B and FIG. 1D. The tapered positioning hole 12 of the second datum ring 5b has remaining portions 12b,12b brought into a fitting engagement with the tapered surface 28 of the shuttle member 23 fitted onto the plug portion 21 of the second datum clamp 5a. This can position the work pallet 3 peripherally and accurately with respect to the reference axis (G) and can absorb a radial error caused with respect to the reference axis (G) owing to the existence of the paired release surfaces 14,14.

The third clamping apparatus 6 has only a clamping function. And it comprises a clamp 6a and a guide ring 6b neither of which has the datum function. More specifically, the clamp 6a has the structure of the first datum clamp 4a, but it excludes the shuttle member 23 (as well as a coned disc spring 24 and a retaining ring 25 to be mentioned later). The guide ring 6b has the structure of the socket bore 11 of the first datum ring 4b except the tapered positioning hole 12.

Although the third clamping apparatus 6 is provided in two sets here, it may be provided in one set and further in at least three sets.

Hereafter, a concrete structure of the first clamping apparatus 4 with datum function is explained by relying on FIGS. 2, 3 and 4. FIG. 2 shows that the work pallet 3 starts being attached to the clamp pallet 2. FIG. 3 shows that the work pallet 3 has been attached to the clamp pallet 2. FIG. 4 shows that the work pallet 3 has been fixed to the clamp pallet 2.

The work pallet 3 has a bottom surface opened to form a socket bore 11 circular in horizontal section and facing downwards. The socket bore 11 comprises the first datum ring 4b formed with the tapered positioning hole 12 and with a tapered engaging hole 13 in order from a lower side. While the tapered positioning hole 12 is formed to narrow upwardly, the tapered engaging hole 13 is formed to narrow downwardly.

The first datum ring 4b has an outer peripheral portion projecting downwards. The annular projection has a bottom surface which forms a surface (T) to be supported.

The first datum clamp 4a comprises a cover block 16 fixed to the clamp pallet 2 through the plurality of bolts 8, a piston 17 hermetically inserted between the cover block 16 and the clamp pallet 2, a hydraulic chamber 18 formed downwards of the piston 17, and a clamp spring 19 attached between the piston 17 and the cover block 16. Here the clamp spring 19 comprises a plurality of coned disc springs vertically superposed one on another, but it may comprise a compression coil spring.

The piston 17, the hydraulic chamber 18 and the clamp spring 19 compose a driving means (D).

The cover block 16 has an outer peripheral portion projecting upwards. The annular projection has an upper surface which forms a support surface (S). The cover block 16 has a mid portion from which an annular plug portion 21 projects upwards. The plug portion 21 is inserted into the socket bore 11.

The plug portion 21 has a lower portion onto which the annular shuttle member 23 is fitted. The shuttle member 23 is urged upward through a coned disc spring (resilient member) 24 and is received by a retaining ring 25.

Speaking it in more detail, the annular shuttle member 23 has an inner peripheral surface formed by a straight surface 27 and has an outer peripheral surface constructed by the tapered surface 28. The tapered surface 28 and the straight surface 27 can diametrically expand and contract by providing slits in an annular wall of the shuttle member 23 or grooves in the inner peripheral surface thereof (either of which is not shown). The straight surface 27 is supported by an outer peripheral surface of the plug portion 21 so as to be axially movable. The tapered surface 28 is formed to narrow upwards so as to make a tapering engagement with the tapered positioning hole 12. The tapered surface 28 has a taper angle, which is preferable within a range of about 4 degrees to about 20 degrees and is more preferable within a range of about 6 degrees to about 15 degrees. Here it is set to about 10 degrees.

The plug portion 21 has a cylindrical hole 21a into which a pull rod 31 is axially movably inserted. The plug portion 21 has a mid height portion provided with a plurality of through holes 33 peripherally spaced apart from each other at a predetermined interval. Each of the through holes 33 supports an engaging ball (engaging member) 34 so that the engaging ball (engaging member) 34 can move between a radially outward engaging position (X) (see FIG. 4) and a radially inward disengaging position (Y) (see FIG. 2). The ball 34 is prevented from jumping out by a radially reduced portion 33a at an outer end of the through hole 33.

An outer peripheral surface of the pull rod 31 has an upper portion at which a pushing surface (output portion) 36 and a retreat groove 37 are formed in vertical continuity in correspondence with each of the balls 34. The pull rod 31 has a lower portion fixed to the piston 17 through a tightening bolt 39.

Further, there is provided a means for cleaning the fitting surfaces of the first clamping apparatus 4. More specifically, the clamp pallet 2 is provided with a supply port 41 for compressed air (cleaning fluid) and the pull rod 31 is provided at its upper end portion with a blowout hole 42 obliquely and upwardly. The supply port 41 communicates with the blowout hole 42 through a horizontal flow passage 43 within the cover bolt 16 and a vertical flow passage 44 within the pull rod 31. The vertical flow passage 44 is sealed by vertically arranged O-rings 45 and 46.

It is sufficient if the blowout hole 42 is provided at one portion. However, preferably, a plurality of the blowout hole 42 are provided and peripherally spaced apart from each other at a predetermined interval.

The cleaning means is provided in the second clamping apparatus 5 and the third clamping apparatuses 6,6 as well as in the first clamping apparatus 4.

The first clamping apparatus 4 operates in the following manner as shown in FIGS. 2 to 4.

In a state shown by FIG. 2, pressurized oil is supplied to the hydraulic chamber 18 through a pressurized oil supply and discharge passage 48. Thus the hydraulic chamber 18 produces an oil pressure by which the piston 17 raises the pull rod 31 against the clamp spring 19 and each ball 34 faces the retreat groove 37 to become movable to the illustrated disengaging position (Y). In addition, the coned disc spring 24 holds the shuttle member 23 at a raised position.

And as shown in FIG. 2, when the work pallet 3 has descended with respect to the clamp pallet 2, the socket bore 11 has a tapered guide hole 11b guided by a tapered guide surface 21b of the plug portion 21 to result in making an axis of the socket bore 11 substantially coincident with that of the plug portion 21.

In the state shown by FIG. 2, when cleaning compressed air is supplied to the supply port 41, it is vigorously discharged through the blowout hole 42. The discharged compressed air cleans a top surface and a peripheral surface of the socket bore 11 and thereafter is discharged downwards.

When the work pallet 3 further descends, the tapered positioning hole 12 is guided by the tapered surface 28 of the shuttle member 23. Subsequently, as shown in FIG. 3, the socket bore 11 has a top wall 11a brought into contact with an upper surface of the pull rod 31, thereby enabling the pull rod 31 to receive the work pallet 3.

In a state shown by FIG. 3, the compressed air discharged through the blowout hole 42 cleans a surface of the engaging hole 13, a fitting gap ($\alpha$) between the tapered surface 28 of the shuttle member 23 and the tapered positioning hole 12, and a contact gap ($\beta$) between the support surface (S) and the surface (T) to be supported in order. Thereafter, it is discharged to an exterior area. Preferably, the tapered positioning hole 12 is formed with a plurality of blow grooves 12a peripherally spaced apart from each other at a predetermined interval. Further, the coned disc spring 24 has a cavity at its lower portion. Preferably, the cavity is communicated with the horizontal flow passage 43 through a branched passage (not shown) to thereby supply the cleaning compressed air to this cavity.

In the state shown by FIG. 3, when discharging the pressurized oil of the hydraulic chamber 18 through the supply and discharge passage 48, the clamp spring 19 strongly lowers the pull rod 31 through the piston 17. Then, first, the work pallet 3 descends by its own weight following the lowering of the pull rod 31 to bring the tapered positioning hole 12 into contact with the tapered surface 28 of the shuttle member 23. This allows the work pallet 3 to slightly compress the coned disc spring 24 through the shuttle member 23 and moves the tapered positioning hole 12 while it is aligning to make its axis coincident with an axis of the plug portion 21.

Substantially at the same time as this operation, as shown in FIG. 4, each pushing surface 36 of the pull rod 31 pushes each of the balls 34 to the radially outward engaging position (X). The radial pushing force a is converted to a downward force through the tapered engaging hole 13. The downward force strongly lowers the work pallet 3.

Then the tapered positioning hole 12 makes a strong tapering engagement with the tapered surface 28 of the shuttle member 23 and moves while aligning. This makes the axis of the tapered positioning hole 12 precisely coincident with that of the plug portion 21 and further lowers the shuttle member 23 against the coned disc spring 24, thereby enabling the support surface (S) to receive the surface (T) to be supported. Thus the work pallet 3 is constrained horizontally through the shuttle member 23 which the tapered positioning hole 12 has radially reduced, by the plug portion 21 and vertically by the support surface (S). As a result, the work pallet 3 can be precisely and strongly positioned and fixed to the clamp pallet 2.

After the clamping has been completed as shown in FIG. 4, the contact gap ($\beta$) shown in FIG. 3 disappears to airtightly seals a space between the support surface (S) and the surface (T) to be supported. Therefore, the cleaning compressed air loses its way of escape to increase the pressure of the supply port 41. A pressure switch (not shown) detects the pressure increase to result in the possibility of automatically confirming the above-mentioned completion of the clamping.

When confirming the completion of the clamping, it is preferable to reduce the pressure of the compressed air to a lower one than that of the cleaning compressed air and to detect the increased pressure of the compressed air of the lower pressure.

When changing a clamping condition shown in FIG. 4 over to an unclamping condition shown in FIG. 3, it suffices if the pressurized oil is supplied to the hydraulic chamber 18 in the state shown in FIG. 4. Then. as shown in FIG. 3, the hydraulic chamber 18 produces an oil pressure by which the piston 17 raises the pull rod 31, thereby allowing each of the balls 34 to face the retreat groove 37 to switch over (shown to have already switched over in FIG. 3) to the disengaging position (Y) and bringing the pull rod 31 into contact with the top wall 11a of the socket bore 11 to push up the work pallet 3. This forms the fitting gap (α) on an upper side of the shuttle member 23 and the contact gap (β) on an upper side of the support surface (S). In consequence, the work pallet 3 can be easily removed from the clamp pallet 2.

In the first embodiment, the lower clamp pallet 2 is provided with the plug portion 21 and the upper work pallet 3 is provided with the socket bore 11. Owing to this arrangement, it is possible to prevent chips or the like foreign matters from invading the clamping apparatus during the working of the machining center.

Additionally, the shuttle member 23 has a lower space covered with the coned disc spring 24. This can prevent foreign matters from invading the lower space to smoothly move up and down the shuttle member 23. The coned disc spring 24 may be provided in plural number and superposed one on another instead of providing a single one. Further, it may be replaced with a compression coil spring or the like other kinds of springs.

A space for accommodating the clamp spring 19 communicates with the exterior area through a breather passage 49. Preferably, although not shown, the breather passage 49 is provided with a check valve seat and a check valve chamber in order from an inner side to urge a check member inserted into the check valve chamber toward the check valve seat through a weak spring. This can prevent foreign matters such as dust and cutting lubricant in the atmosphere from invading the clamping apparatus.

Figure 5:
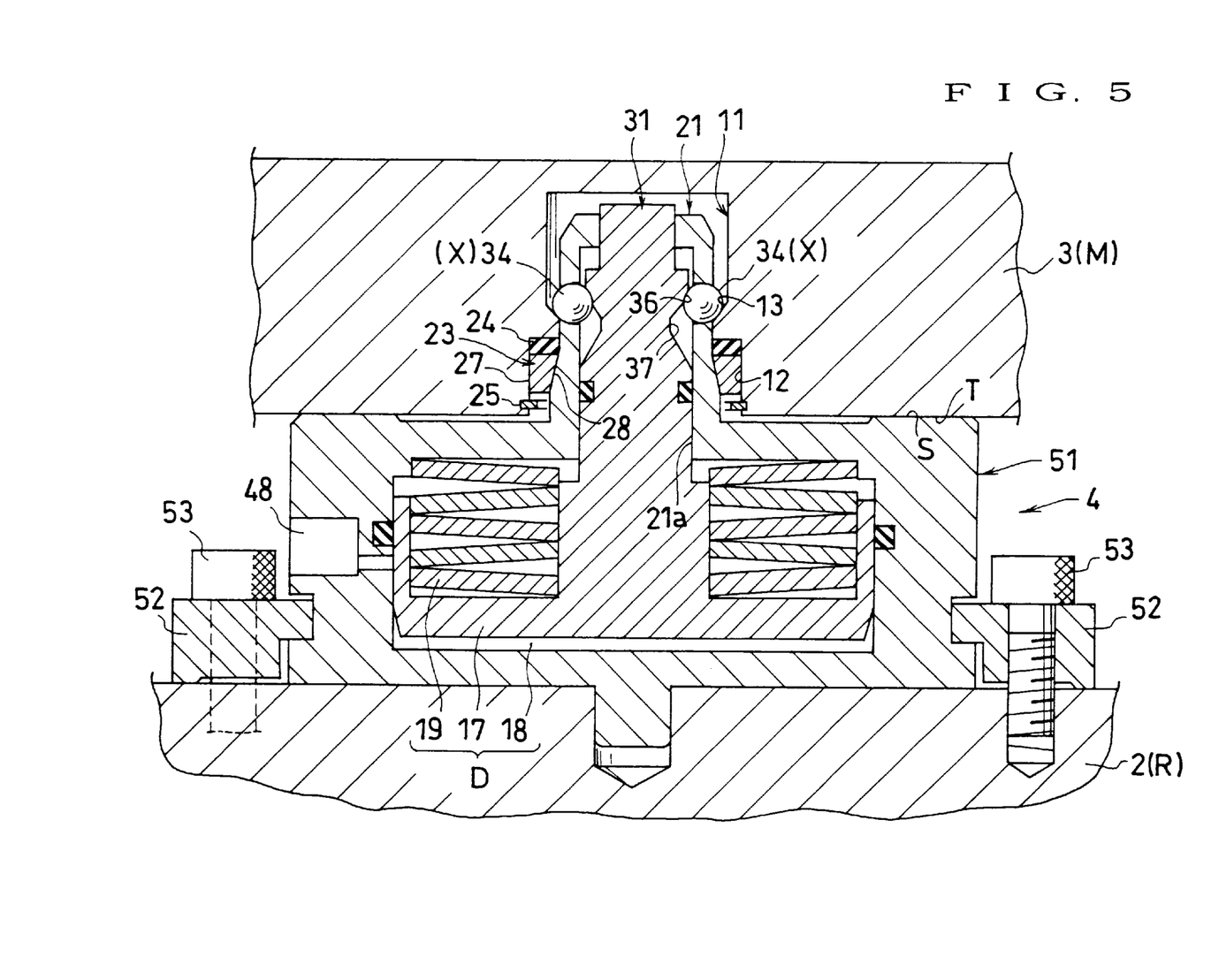
FIG. 5 shows a second embodiment of the clamping apparatus a n d corresponds to FIG. 4.

FIG. 5 shows a second embodiment of the present invention and corresponds to FIG. 4. In this second embodiment, the same constituent members as those in the first embodiment are, in principle, designated by the same characters. Then explanation is limited to a construction different from that of the first embodiment.

A clamp block 51 is fixed to an upper surface of the clamp pallet 2 through pushing members 52 and bolts 53. The piston 17 is hermetically inserted into the clamp block 51.

The positioning hole 12 of the socket bore 11 formed in the work pallet 3 is made straight. The straight surface 27 on a periphery of the shuttle member 23 is vertically movably supported by the straight positioning hole 12. The shuttle member 23 is urged downwards by the resilient member 24 made of rubber and is inhibited from descending by the retaining ring 25 attached to a lower portion of the positioning hole 12 in fitting relationship.

The shuttle member 23 has an inner surface formed with the tapered surface 28, which makes a tapering engagement with an outer peripheral surface of the plug portion 21. The tapered surface 28 is formed so as to narrow upwardly.

The foregoing respective embodiments can be modified as follows.

The reference member (R) may be a table of the machining center or the like various machines instead of the exemplified clamp pallet 2. The movable member (M) may be a workpiece instead of the exemplified work pallet 3. The reference member (R) and the movable member (M) may be arranged in a vertically reversed manner and may be connected to each other horizontally or obliquely instead of vertically as exemplified.

Further, it is a matter of course that a clamping apparatus with datum function of the present invention can be used to clamp not only the work pallet and the workpiece but also a metal die, an attachment or the like. The clamping apparatus with datum function can be employed not only in plural sets but also in only a single set.

Besides, the shuttle member 23 of the clamping apparatus is not limited to the exemplified annular integral structure. It may comprise a plurality of divided portions arranged annularly.

In addition, the engaging member 34 of the clamping apparatus may be a collet which engages with the straight engaging hole by a frictional force or a plastic deformation force instead of the exemplified ball which engages with the tapered engaging hole. The clamping apparatus may be driven for clamping through fluid pressure such as oil pressure and air pressure instead of the spring force.

What is claimed is:

1. A clamping apparatus with datum function which aligns a movable member (M) with a reference member (R) and fixes a surface (T) to be supported of the movable member (M) to a support surface (S) of the reference member (R), the clamping apparatus comprising:

a socket bore (11) formed in the movable member (M), the socket bore (11) being provided with an opened end formed by opening the surface (T) to be supported and having a positioning hole (12) and an engaging hole (13) formed in order from the opened end;

an annular plug portion (21) having a cylindrical hole (21a) and projecting from the reference member (R) so as to be inserted into the socket bore (11);

a shuttle member (23) having a tapered surface (28), which is arranged between the plug portion (21) and the positioning hole (12) and diametrically expands and contracts, the shuttle member (23) being supported by one of the plug portion (21) and the positioning hole (12) so as to be axially movable within a predetermined range and making a tapering engagement with the other, the tapered surface (28) for the tapering engagement being-formed so as to narrow toward the engaging hole (13);

a resilient member (24) urging the shuttle member (23) in a direction for tightening the tapering engagement;

a pull rod (31) having a first end, a second end and an output portion (36), the pull rod (31) being axially movably inserted into the cylindrical hole (21a) of the plug portion (21);

an engaging member (34) arranged in an outer peripheral space of the pull rod (31) and being movable between a radially outward engaging position (X) and a radially inward disengaging position (Y);

a driving means (D) provided in the reference member (R) and connected to the pull rod (31); and the driving means (D) driving the pull rod (31) for clamping in a direction toward the first end, thereby enabling the output portion (36) of the pull rod (31) to switch over the engaging member (34) to the engaging position (X) for engaging it with the engaging hole (13) to move the movable member (M) toward the reference member (R), the driving means (D) driving the pull rod (31) for unclamping in a direction toward the second end, thereby allowing the engaging member (34) to switch over to the disengaging position (C).

2. The clamping apparatus as set forth in claim 1, wherein the shuttle member (23) has an inner peripheral surface and an outer peripheral surface, the inner peripheral surface being formed by a straight surface (27) and the outer peripheral surface being defined by the tapered surface (28), the straight surface (27) being supported by the plug portion (21) so as to be axially movable, the tapered surface (28) making the tapering engagement with the positioning hole (12).

3. The clamping apparatus as set forth in claim 2, wherein the socket bore (11) has a top wall (11a), and when driving the pull rod (31) for undamping in the direction toward the second end, the second end of the pull rod (31) urges the top wall (11a) to form a fitting gap (α) for the tapering engagement on the shuttle member (23) and a contact gap (β) between the supporting surface (S) and the supported surface (T).

4. The clamping apparatus as set forth in claim 1, wherein the reference member (R) is provided with a supply port (41) for cleaning fluid and the second end of the pull rod (31) is provided with a blowout hole (42) for the cleaning fluid wherein the pull rod (31) includes a flow passage (44) communicating the supply port (41) and the blowout hole (42).

5. The clamping apparatus as set forth in claim 1, wherein the socket bore (11) has a top wall (11a), and when driving the pull rod (31) for unclamping in the direction toward the second end, the second end of the pull rod (31) pushes against the top wall (11a) so as to form a fitting gap (α) for the tapering engagement on the shuttle member (23) and a contact gap (β) between the supporting surface (S) and the supported surface (T).

6. The clamping apparatus as set forth in claim 5, wherein the reference member (R) is provided with a supply port (41) for cleaning fluid and the second end of the pull rod (31) is provided with a blowout hole (42) for the cleaning fluid, wherein the pull rod (31) includes a flow passage (44) communicating the supply port (41) and the blowout hole (42).

7. The clamping apparatus as set forth in claim 2, wherein the reference member (R) is provided with a supply port (41) for cleaning fluid and the second end of the pull rod (31) is provided with a blowout hole (42) for the cleaning fluid wherein the pull rod (31) includes a flow passage (44) communicating the supply port (41) and the blowout hole (42).

* * * * *

US006527266C1

(12) EX PARTE REEXAMINATION CERTIFICATE (4951st)
United States Patent
Yonezawa et al.

(10) Number: US 6,527,266 C1
(45) Certificate Issued: Jun. 22, 2004

(54) CLAMPING APPARATUS WITH DATUM FUNCTION (75) Inventors: Keitaro Yonezawa, Kobe (JP); Tsutomu Shirakawa, Kobe (JP)

(73) Assignee: Kabushiki Kaisha Kosmek, Kobe (JP)

Reexamination Request:
No. 90/006,666, Jun. 11, 2003

Reexamination Certificate for:
Patent No.: 6,527,266
Issued: Mar. 4, 2003
Appl. No.: 09/631,670
Filed: Aug. 3, 2000

(30) Foreign Application Priority Data

Aug. 3, 1999 (JP) .......................... 11-219504

(51) Int. Cl.[7] .............................. B23Q 3/00
(52) U.S. Cl. ............................ 269/309; 269/310
(58) Field of Search ................... 269/309–310

(56) References Cited

U.S. PATENT DOCUMENTS

| 5,716,173 A | 2/1998 | Matsumoto |
| 6,161,826 A | 12/2000 | Forrer |
| 6,527,266 B1 | 3/2003 | Yonezawa et al. |

FOREIGN PATENT DOCUMENTS

| EP | 0 913 588 A2 | 5/1999 |
| EP | 0 922 529 A1 | 6/1999 |
| JP | 5-26241 | 4/1993 |
| JP | 07-314270 | 12/1995 |
| JP | 09-248727 | 9/1997 |

OTHER PUBLICATIONS

International Organization for Standardization web site printout http://www.iso.ch/iso/en/StandardsQueryFormHandler.StandardsQueryFormHandler dated Jul. 23, 2003, pp. 1–2.
NSSN: A Global Resource for Standards web site printout http://www.nssn.org/search.html dated Jul. 23, 2003.

*Primary Examiner*—Robert C. Watson (57) ABSTRACT

A clamp pallet (2) is fixed to a table (1) of a machining center. A work pallet (3) has a positioning hole (12) and an engaging hole (13) formed in order from a lower side. A plug portion (21) projects upwards from the clamp pallet (2). A shuttle member (23) is vertically movably fitted onto the plug portion (21). A coned disc spring (24) urges the shuttle member (23) upwards. The shuttle member (23) has a tapered surface (28) with which the positioning hole (12) makes a tapering engagement. A pull rod (31) is inserted into the plug portion (21). The pull rod (31) pushes engaging balls (34) to the engaging hole (13), thereby driving the work pallet (3) downwards.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

\* \* \* \* \*